Sept. 7, 1965 P. C. HOFSTRA 3,204,633
VOLUMETRIC AUTOMATIC SHUT-OFF FLUID VALVE
FOR INFUSION APPARATUS
Filed July 20, 1961

INVENTORS
PETER C. HOFSTRA
HARVEY J. ENGELSHER
BY
James P. Malone

United States Patent Office 3,204,633
Patented Sept. 7, 1965

3,204,633
VOLUMETRIC AUTOMATIC SHUT-OFF FLUID
VALVE FOR INFUSION APPARATUS
Peter C. Hofstra, Paterson, N.J., and Harvey J. Engelsher, Yonkers, N.Y., assignors to Sterilon Corporation, Buffalo, N.Y., a corporation of Delaware
Filed July 20, 1961, Ser. No. 125,526
7 Claims. (Cl. 128—214)

This invention relates to a novel and simple volumetric, automatic shut-off fluid valve means for regulating flow of fluids.

This invention pertains to the use of simplified, fluid valve that does not require complicated metering arrangement which would require highly skilled and carefully pre-adjusted operating conditions. A unique characteristc of this invention is the valving arrangement that once the volume has been chosen for a given administration, the valve can be left unattended along with a pre-regulated flow rate until the desired volume is dispensed. This valve is of particular value in the administration of biological fluids, particularly whole or derived form of blood into patients and has provisions for complete safety that would not permit the inadvertent administration of air.

In many chemical reactions that require careful metering of two or more components, it is frequently necessary to adjust manually the volume and rate with constant attention. In the valve arrangement of this invention, this requirement, as will be shown in ensuing examples, is dispensed with completely.

More particularly, in the intravenous feeding of patients, the administration of whole blood or its derived form, requires constant attention on the part of a skilled technician in order to insure that the directed administration of blood fluids is stopped as directed clinically. In the valve device of this invention the need for such personal control is eliminated altogether. This means that in any intravenous system of feeding, there is no need to have an attendant constantly around the patient. Moreover the depletion of the fluid to the automatic volumetric shut-off will obviate the apprehension when the predetermined administration is approached. The valve of this invention has particular appeal in its assured operation to both patients and the medical personnel concerned. This valve has in addition other specific clinical advantages that are elaborated on in our copending application, entitled "New Improved Intravenous Valve Device," filed August 14, 1961, S.N. 131,237.

The volumetric, automatic shut-off valve means and other components described herein can be constructed of a variety of polymeric or plastic tubing and membrane materials that include polyethylene, crosslinked polyethylene through chemical and high energy means, polypropylene, natural and synthetic rubber, and other unique polymers such as polytetrafluoroethylene and fluorinated ethylene propylene copolymers. When assembled according to the teaching of this invention, the valve provides self-operating characteristics that cannot provide any errors due to mechanical or personal complications.

This valve has been developed and adapted to the administration not only of a single fluid system but may be used in simultaneous multiple fluid administrations. Once having predetermined the multiple fluid systems to be applied in a given chemical or clinical adjustment, the automatic shut-off valve means will automatically meter and shut off.

The principal object of this invention is to provide an efficient and simplified fluid valve for use in the addition of chemical and biological fluids to predetermined volumes and at predetermined rates of flow.

Another object of this invention is to provide a simplified fluid valve comprising a volumetric shut-off that can be adjusted and regulated to any desired conditions.

A further object of this invention is to provide a volumetric valve that can be applied repeatedly without disturbing the continued hydrostatic flow.

A still further object of this invention is to provide an automatic shut-off and metering arrangement that will permit the safe administration of biological fluids, particularly for intravenous administrations, with enhanced safety and without the need for personal attention, and without any danger of injecting air into the veins.

These and other objects of the invention will be apparent from the following specification and drawings, of which FIG. 1 is an elevation view of one embodiment of the invention;

Figure 1:
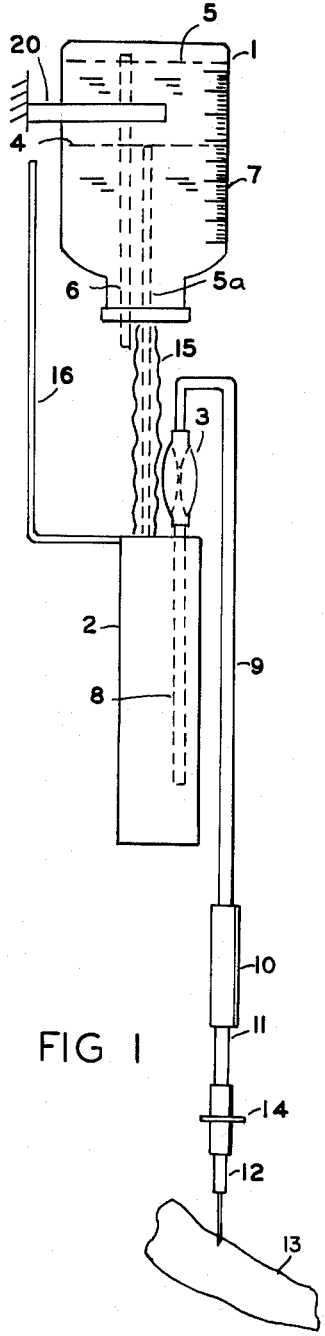

FIG. 1 is a schematic view of the components of this invention. These include the volumetrically marked container 1 on holding clamp 20; a compressible plastic container 2 serving to (a) prime the hydrostatic system, (b) to act as an air bubble trap, (c) to return trapped air to container 1, and a flexible collapsible automatic shut-off valve 3 which is designed to close automatically when the fluid level in the bottle 1 drops to a terminating level at point 4.

In practice the volumetric measuring of this invention is regulated by means of atmospheric pressure inlet tube 6, calibrated volumetric scale 7, and terminating fluid level tube 5a adjusted for the predetermined volume by difference in fluid level at 4 and 5. The compressible plastic compartment 2 is used to prime the system thereby providing a continued flow of fluid through tube 8 passing through the automatic flexible shut-off valve 3 which leads to an emergent fluid tube 9 into a conventional transparent visual drip control tube 10 and leading into a flexible tube 11 attached to a hypodermic needle 12 that is introduced into the vascular system 13.

The whole blood or biological fluid is contained in the bottle or vessel 1 and the valve and drip control assembly is primed by flexing the plastic component 2 to expel all contained air through the atmospheric opening at 6 and thus provide a fluid continuum. Once the fluid continuum has been established down to the vascular system, a regulating pinch clamp 14 is then opened to provide a flow rate based on the drip in component 10. The unique feature of this valve is that as the volumetric flow is depleted at the level 5, the entire fluid system from the vascular system to the automatic shut-off valve at 3 is thereby completely contained for the next administration.

In operation, the system is first primed by squeezing the flexible plastic member 2 to exhaust the air through the tube 5a. This causes the member 2 to fill up and to start a continuous flow of fluid up the tube 8 through the hollow member 3 and down the tube 9. Clamp 14 is opened to bleed any air out of the system. An initial volume reading is then made on scale 7 and the tube 5a is then moved down the scale 7 the desired volume amount to be discharged. The needle is then inserted in the patient and the drip rate in transparent member 10 is adjusted by means of the clamp 14. The fluid will continue to be fed down tube 5a until the level in the container 1 falls to the top of the tube 5a, shown as point 4. A small amount of fluid will still continue to be fed to the needle 12 until the fluid level in the container 2 falls sufficiently to collapse valve 3 as shown by the dotted lines and the flow of fluid will stop.

It is important to note that even though the original container 1 is separated from the valving and tubing arrangement, and another container substituted, the entire system including the hydrostatic head in column 9 remains intact and requires only a simple re-priming of component 2 to reactivate the air-free flow of fluid. As a further improvement of this invention the emergent hydrostatic tube 5a may be sheathed with a sterile flexible covering 15 in order to maintain sterility and chemical purity of the tube. Additionally, the emergent tube 5a may be scored with suitable graduations relative to the volumetric capacity of container 1, thereby providing a visual external device for metering of opaque biological fluids. A further embodiment is the attachment of an external metering rod 16 permanently attached to priming component 2 and having its topmost point in the same plane as the topmost point of emergent tube 5a thereby providing an alternate device for the volumetric measurement of opaque fluids.

A valuable feature of this metered arrangement is the fact that once the flow rate has been regulated by means of the pinch clamp 14 the flow into the vascular system can now be left unattended as it is self-operating to the predetermined volume level. The clinical value of this device is the complete safety in the full administration of the predetermined fluid which does not require not only personal attendance but any use of electronic or mass gravimetric systems that are subject to mechanical errors or uncertainty. A still further advantage of this arrangement is the release of skilled attendants to other assignments and thus provide an important saving in personnel for other technical duties.

Figures 2, 3:
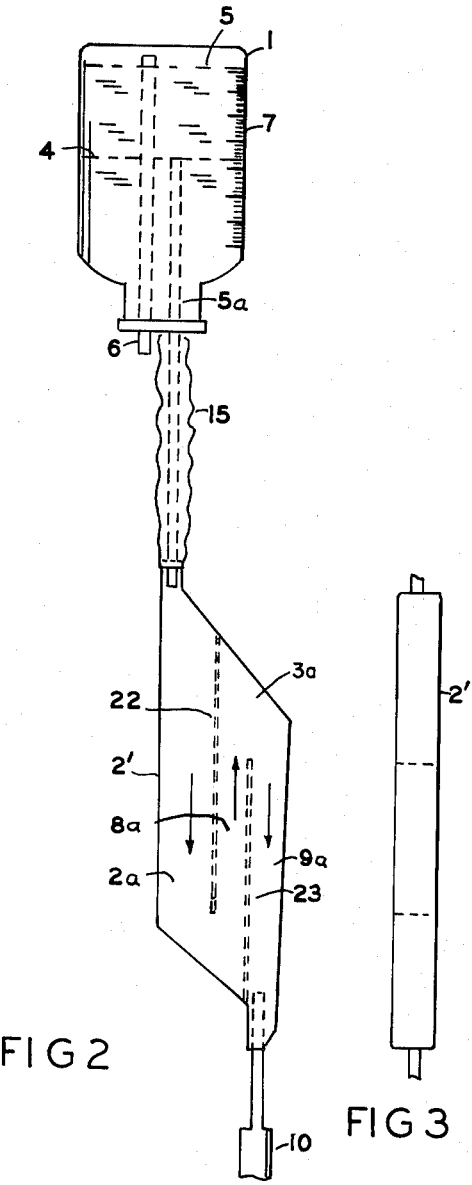
FIG. 2 is an elevation view of another embodiment of the invention.
FIG. 3 is a side detail view of FIG. 2.

FIG. 2 provides a still further simplified arrangement of the priming component 2 and automatic shut-off valve 3 of FIG. 1. In this case a flexible automatic shut-off and priming container 2' having heat-sealed sets of compartments duplicates the functions of FIG. 1.

FIG. 3 shows a side view of container 2'. The container 2' is a hollow plastic container which is divided into three flow-through compartments by means of the partition 22 connected to the upper side of the container 2' and extending down adjacent the bottom of the container 2' but being open at the bottom end. A second partition 23 is provided which is connected to the bottom end of container 2' and which extends parallel the partition 22 in an upward direction but not all the way to the top of the container 2' so that there is an opening adjacent the top of the container. The container 2' may be a plastic bag of conventional plastic material preferably transparent and the partitions 22 and 23 may be heat sealed to the bag 2 along their edges.

The partitions therefore provide an inflow compartment 2a, an upward flow compartment 8a, a valve head 3a, and a downward hydrostatic flow compartment 9a into the drip control 10 similar to that of FIG. 1. The entire valve shut-off is primed manually by simply connecting to the storage bottle 1 and squeezing out the air entrapped in the valve compartment 2a. Once the air has been expelled through the metering tube 5a and balanced atmospherically through the outlet tube 6, the fluid is then regulated by clamping 14 for required flow. Clamp 14 may be a member having a tapered slot for pinching the tube.

Chamber 2a is constructed large enough to receive all of the fluid in emergent tube 5a which will drain into it when the fluid in container 1 reaches the terminating level 4. This feature insures the entrapment of all air in chamber 2a which can then be readily re-primed by, (a) lowering tube 5a to a new position in the same container or (b) replacing the empty container with a full one and simply squeezing the air out of chamber 2a. In this case a relatively simple and inexpensive heat sealed automatic cut-off valve is provided where the heat sealing furnishes the entire exterior component and the interior compartments.

A further advantage is the provision of a sterilizable valve 2' made from any of the polymeric flexible materials listed previously. In addition, the heat sealed valve can be made of chemically inert plastics particularly polymers and copolymers of polytetrafluoroethylene, such as described in copending application for Intravenous Valve Device, filed August 14, 1961, S.N. 131,237.

In operation the container 2' of FIGS. 2 and 3 is squeezed to exhaust the air. The fluid then flows down through the tube 5a into the compartment 2a, filling up compartments 2a and 8a and flowing over into compartment 9a. Clamp 14 is opened to bleed all air out of the system allowing some fluid to drain through the complete system. The top of the tube 5a is then set at the predetermined volume mark. This flow will continue until the fluid level decreases to the top of the tube 5a, at which point the tube 5a will drain into the compartment 2a and the flow will stop when the hydrostatic head in tube 5a is lost, causing the flexible container compartments 8a and 9a to collapse.

An example furnishing an illustration of the merit of this automatic valving and cut-off device is the precipitation of barium sulfate under agitated conditions. By the use of two of the valve metering arrangements described in FIG. 1, it has been possible to prepare precipitated barium sulfate which has a considerable smaller amount of occluded chloride ions. Equimolar aqueous solutions of sodium sulfate and barium chloride at a concentration of 0.02 mole/liter are introduced into a 2 liter beaker using a laboratory stirrer at a speed of 100 r.p.m. are introduced at a rate of 0.1 cc./sec. using the volumetric feed and automatic shut-off valves of FIG. 1. Also for control purposes similar solutions are added from a calibrated burette operated manually in a steady stream amounting to approximately 2 cc./min. After the equimolecular volume, 500 cc. has been introduced, the precipitate in both cases has been allowed to settle for 4 hours on room temperature and the supernatant liquid decanted. The precipitated barium sulfate is then transferred to a filter funnel and washed in each case with 4 liters of distilled water. The two precipitates appear quite different microscopically in that the precipitate from the metered and valved arrangement of FIG. 1 was extremely uniform and lacked any of the coarseness that was evidenced in that made from the manually operated burettes. Furthermore a chemical analysis revealed that the barium sulfate precipitated by the controlled volumetric feeding contained less than 10 p.p.m. of chloride ion whereas the precipitate made by the manually metering arrangement had from 40 to 100 p.p.m. of chloride ion that was entrapped presumably as a result of uneven and erratic feeding of the reacting volumes. This example illustrates the value of this simplified arrangement in making available reacting solutions at fairly uniform molar volumes.

Another example is an analysis of free carbon dioxide content of a sample of beer based on volume evolved at normal atmospheric conditions, which was determined with considerable precision by use of the valving device of FIG. 1 as compared to the valving arrangement done manually by individual operators. Into a 100 cc. gas analysis flask fitted with an immersion tubing for the absorption of carbon dioxide by means of barium chloride solution, an inlet tube in which the beer was volumetrically introduced at increments of 50 cubic centimeters was determined. The following tabulation shows the variation in the precision comparing the introduction of the beer into the reaction vessel maintained at 65° C. for the expelling rate of the carbon dioxide:

| Fluid Method | No. of Samples | $CO_2$ Content Average | Standard Deviation |
| --- | --- | --- | --- |
| Manual from burette | 12 | 0.862 | ±0.042 |
| Automatic from Valve Fig. 1 | 12 | 0.866 | ±0.006 |

The standard deviation, calculated by usual statistical procedure, shows the marked improvement in analytical precision attained by valve device of FIG. 1.

The above results clearly illustrate the greater level of precision attainable with the volumetric feeding compared to the manual introduction of the beer under analysis. These results indicate further the value in setting up an adjustable but precise volume.

In another example the clinical application of whole blood to a patient was made possible in several stages by adjusting the administered volume in increments of 250 cc. The first administration required a time lapse of 60 minutes, followed by a check on the patient thermalgraph for the next 60 minutes, again followed by a second intravenous injection. With the use of the valving arrangement once primed, the normal response of the patient leveled out in the majority of cases to erratic pulse and the temperature profile as a consequence of the continued sustaining of the introduction of the blood fluid. More particularly, it was found that by this technique the administration of the whole blood could be deliberately curtailed until the pulse pattern and the temperature pattern leveled down to a clinically accepted level. Finally, in instances where there has been a need for several lots of volumes of whole blood administration, the automatic valve and the hydrostatic head of container 1 can be sustained without breaking the fluid continuum, thereby avoiding air or gas embolization. This unique feature is apparent for both blood and other intravenous fluid systems and illustrates the particular advantages this invention has as opposed to currently established intravenous feeding systems which do not make provision for curtailing embolism. Further, this invention enables the patient administration of more accurate volumes of fluids without the danger of biological overloading either volumetrically or by chemical constituents. Unlike conventional intravenous feeding equipment, the simple mechanism of operation of this invention precludes the failure of the automatic shut-off valve to close at the proper moment since the principle of operation is dependent upon constant forces.

Although the invention has been described in detail with several typical chemical and clinical applications, these have been by way of explanation rather than limitations. Many modifications including supporting constructions using a variety of flexible materials with additional components of glass and stainless steel, are possible without departing from the spirit of invention.

We claim:
1. Apparatus for administering intravenous fluid by gravity from a fluid source, comprising
   first generally-vertical conduit means adapted for connection at its upper end with said fluid source;
   a hypodermic needle assembly adapted for arrangement at an elevation lower than that of the fluid source;
   second generally vertical conduit means connected at its lower end with said needle assembly;
   means defining a generally S-shaped hydrostatic passage connecting the lower end of said first conduit with the upper end of said second conduit, the passage of said connecting means including in successive order, relative to the direction of fluid flow, a first bend portion at one elevation and a second bend portion at a higher elevation;
   and hydrostatic-pressure-responsive automatically-collapsible valve means arranged in the fluid flow path between said first bend portion and the lower end of said second conduit means at an elevation higher than the elevation of said first bend portion, whereby upon decrease of the hydrostatic pressure in said connecting means below a given value, said valve means closes to interrupt the flow of fluid from said first conduit means to said second conduit means.
2. Apparatus as defined in claim 1 wherein said valve means are arranged between said first and second bend portions.
3. Apparatus as defined in claim 1 wherein said valve means are arranged at said second bend portion.
4. Volumetric metering and shut-off fluid valve means comprising a bottle having volumetric markings thereon, means to hold said bottle in an inverted position, a cover for said bottle, a first hollow tube inserted through said cover to a point above the liquid level in said inverted bottle, said tube being open to atmospheric pressure at its low end, a second hollow tube inserted in said cover to a predetermined mark on said bottle, and plastic valve means connected to the low end of said second tube, comprising a plastic container, said container having a first partition connected to the top thereof and extending adjacent the bottom thereof but being open at the bottom thereof, a second partition connected to the bottom of said container and extending to a point adjacent the top of said container but being open at the top, said partitions forming three compartments, said first two compartments being connected at the bottom of said first partition and said second and third compartments being connected at the top of said second partition, and a third hollow tube connected to the bottom of said third compartment, said container and partitions being made of a flexible plastic so that said container may be squeezed to exhaust the air trapped therein and to establish a partial vacuum.
5. In volumetric metering and shut-off fluid valve means of the type having a bottle having volumetric markings thereon, means to hold said bottle in an inverted position, and a cover for said bottle; a first hollow tube inserted through said cover to a point above the liquid level in said inverted bottle, said tube being open to atmospheric pressure at its low end, a second hollow tube inserted in said cover to a predetermined mark on said bottle and plastic valve means connected to the low end of said second tube, comprising a plastic container, said container having a first partition connected to the top thereof and extending adjacent the bottom thereof but being open at the bottom thereof, a second partition connected to the bottom of said container and extending to a point adjacent the top of said container but being open at the top, said partitions forming three compartments, said first two compartments being connected at the bottom of said first partition and said second and third compartments being connected at the top of said second partition and an aperture in the bottom of said third compartment, said container and partitions being made of a flexible plastic so that said container may be squeezed to exhaust the air trapped therein and to establish a partial vacuum.
6. In volumetric metering and shut-off fluid valve means,
   a vented container having volumetric markings thereon,
   a first vertical hollow tube inserted through the bottom of said container to a predetermined mark on said container and plastic valve means connected to the lower end of said first tube comprising;
   a flexible envelope connected to said first tube,
   a second tube mounted in the top of said envelope and extending down inside said envelope to a point adjacent the bottom of said envelope, and
   a collapsible member connected to the top of said second tube,
   said collapsible member being adapted to collapse when the liquid level of said container falls to said predetermined mark.
7. Volumetric metering and shut-off fluid valve means comprising
   a vented bottle having volumetric markings thereon, means to hold said bottle vertically,
   a first hollow tube inserted in the bottom of said bottle to a predetermined mark on said bottle and plastic valve means connected to the low end of said tube, comprising
a plastic container,
said container having a first partition connected to the top thereof and extending adjacent the bottom thereof but being open at the bottom thereof,
a second partition connected to the bottom of said container and extending to a point adjacent the top of said container but being open at the top,
said partitions forming three compartments,
said first two compartments being connected at the bottom of said first partition and
said second and third compartments being connected at the top of said second partition, and
an exit aperture connected in the bottom of said third compartment,
said container and partitions being made of a flexible plastic so that said container may be squeezed to exhaust the air trapped therein and to establish a partial vacuum.

References Cited in the file of this patent
UNITED STATES PATENTS

| 1,392,601 | 10/21 | Rose | 222—214 |
| 1,667,137 | 4/28 | Baker et al. | 222—434 |
| 1,676,601 | 7/28 | Cavanaugh | 222—212 X |
| 1,835,039 | 12/31 | Guest et al. | 222—434 |
| 2,276,421 | 3/42 | Ross | 128—214 |
| 2,667,288 | 1/54 | Mach | 222—212 X |
| 2,969,063 | 1/61 | Broman | 128—214 |
| 2,989,052 | 6/61 | Browman | 128—214 |
| 3,105,490 | 10/63 | Schoenfeld | 128—214 |

FOREIGN PATENTS

| 617,210 | 11/26 | France. |
| 1,108,782 | 9/55 | France. |

RICHARD A. GAUDET, *Primary Examiner.*

RAPHAEL M. LUPO, LOUIS J. DEMBO, *Examiners.*